United States Patent
Gilboa

(10) Patent No.: US 9,470,778 B2
(45) Date of Patent: Oct. 18, 2016

(54) LEARNING FROM HIGH QUALITY DEPTH MEASUREMENTS

(75) Inventor: Guy Gilboa, Tivon (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 863 days.

(21) Appl. No.: 13/075,060

(22) Filed: Mar. 29, 2011

(65) Prior Publication Data

US 2012/0249738 A1 Oct. 4, 2012

(51) Int. Cl.
| | |
|---|---|
| H04N 13/02 | (2006.01) |
| G01S 7/497 | (2006.01) |
| G01S 17/89 | (2006.01) |
| G06T 7/00 | (2006.01) |
| H04N 17/00 | (2006.01) |

(52) U.S. Cl.
CPC .............. *G01S 7/497* (2013.01); *G01S 17/89* (2013.01); *G06T 7/0018* (2013.01); *H04N 13/02* (2013.01); *G06T 2207/10028* (2013.01); *H04N 17/002* (2013.01)

(58) Field of Classification Search
CPC ..... G01S 17/89; G01S 7/497; G06T 7/0018; G06T 2207/10028; H04N 17/002; H04N 13/02; G06K 9/00
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A * | 1/1989 | Svetkoff et al. | 356/608 |
| 4,809,065 A | 2/1989 | Harris et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Mohammed Jebari
(74) *Attorney, Agent, or Firm* — Gregg Wisdom; Judy Yee; Micky Minhas

(57) ABSTRACT

A depth camera computing device is provided, including a depth camera and a data-holding subsystem holding instructions executable by a logic subsystem. The instructions are configured to receive a raw image from the depth camera, convert the raw image into a processed image according to a weighting function, and output the processed image. The weighing function is configured to vary test light intensity information generated by the depth camera from a native image collected by the depth camera from a calibration scene toward calibration light intensity information of a reference image collected by a high-precision test source from the calibration scene.

20 Claims, 6 Drawing Sheets

(56) References Cited

U.S. PATENT DOCUMENTS

| | | |
|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,359,385 A | 10/1994 | Ishida et al. |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,679 B1 | 7/2009 | Gutierrez |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |

(56) References Cited

U.S. PATENT DOCUMENTS

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,787,105 | B2 | 8/2010 | Hipp |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0026838 | A1 | 1/2008 | Dunstan et al. |
| 2010/0046802 | A1* | 2/2010 | Watanabe et al. ............ 382/106 |
| 2010/0208034 | A1* | 8/2010 | Chen .............................. 348/46 |
| 2011/0025827 | A1* | 2/2011 | Shpunt et al. .................. 348/47 |
| 2011/0032341 | A1* | 2/2011 | Ignatov et al. ................. 348/51 |
| 2011/0069064 | A1* | 3/2011 | Zhang et al. ................. 345/419 |
| 2011/0096832 | A1* | 4/2011 | Zhang et al. ............ 375/240.08 |
| 2011/0211045 | A1* | 9/2011 | Bollano et al. ................. 348/46 |
| 2011/0254923 | A1* | 10/2011 | Choi et al. ...................... 348/46 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995. European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Oprisescu, et al., "Measurements with ToF Cameras and Their Necessary Corrections", Retrieved at <<http://www.artts.eu/publications/oprisescu_et_al_ieee.pdf>>, In the Proceedings of ISSCS, Jul. 12-13, 2007, p. 4.

Ringbeck, et al., "A 3D Time of Flight Camera for Object Detection", Retrieved at <<http://www.ifm.com/obj/O1D_Paper-PMD.pdf>> Jul. 9-12, 2007, p. 10.

Joodaki, et al., "Using Neural Networks for High Resolution Distance Measurements Radar" Retrieved at <<http://ieeexplore.ieee.org/stamp/stamp.jsp?arnumber=00928274>>, In the Proceedings of the 18th IEEE Instrumentation and Measurement Technology Conference, May 21-23, 2001, pp. 1242-1246.

Falie, et al., "Distance errors correction for the Time of Flight (ToF) Cameras" Retrieved at <<http://ieeexplore.ieee.org/stamp/stamp.jsp?arnumber=04611675>>, In the Proceedings of 4th European Conference on Circuits and Systems for Communications, Jul. 10-11, 2008, pp. 193-196.

\* cited by examiner

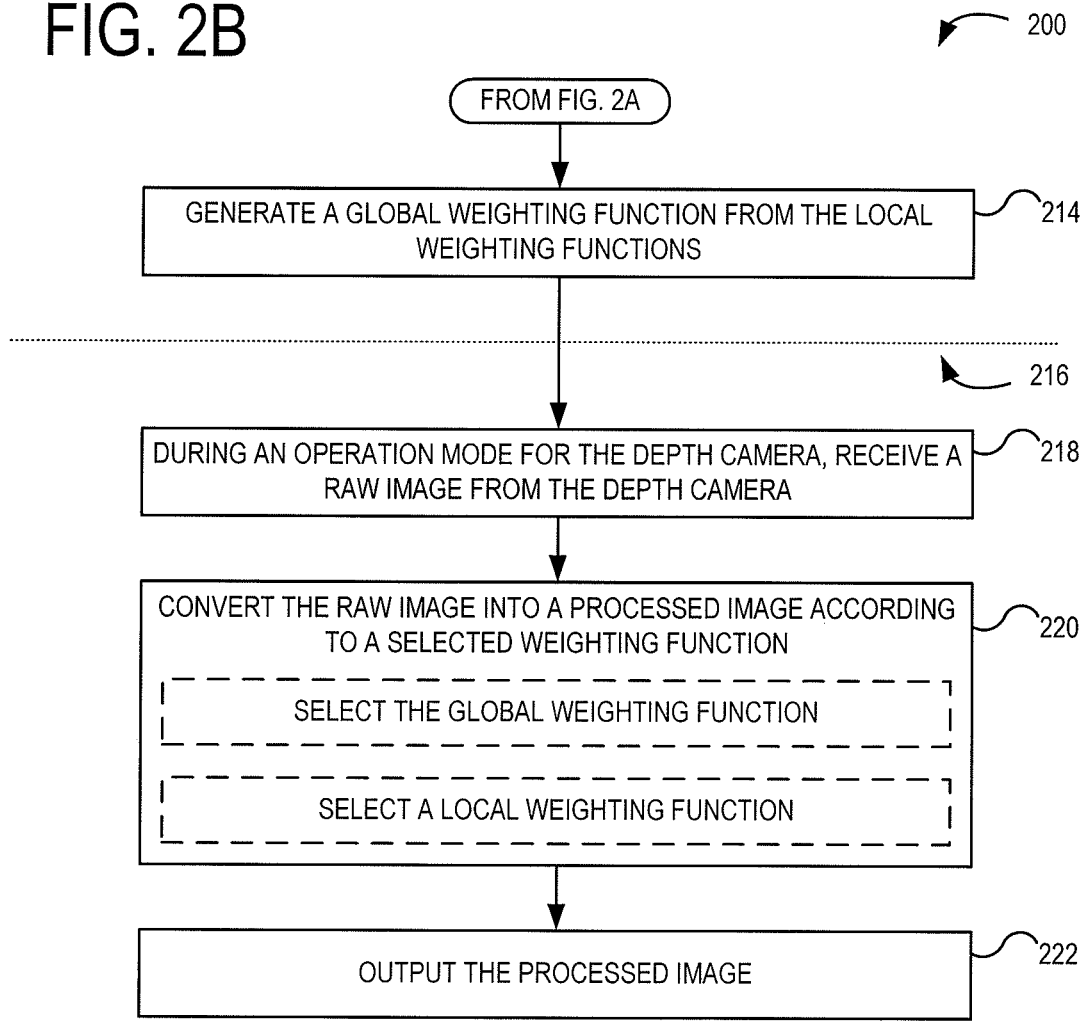

LEARNING FROM HIGH QUALITY DEPTH MEASUREMENTS

BACKGROUND

Measuring distances with a depth camera can be difficult. Measurement accuracy and precision may be influenced by camera hardware, such as illumination light and photodetector sensitivity, the effectiveness of which may be convoluted with environmental factors, such as contrast ratio and ambient light levels.

SUMMARY

Various embodiments of methods and hardware for improving the accuracy of depth measurements derived from images collected by a depth camera are disclosed. In one example, raw images collected by a depth camera are converted to processed images by applying a weighting function to raw image data. In this example, the weighting function is generated from an image of a calibration scene collected by the depth camera and an image of the calibration scene collected by a high-precision test source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
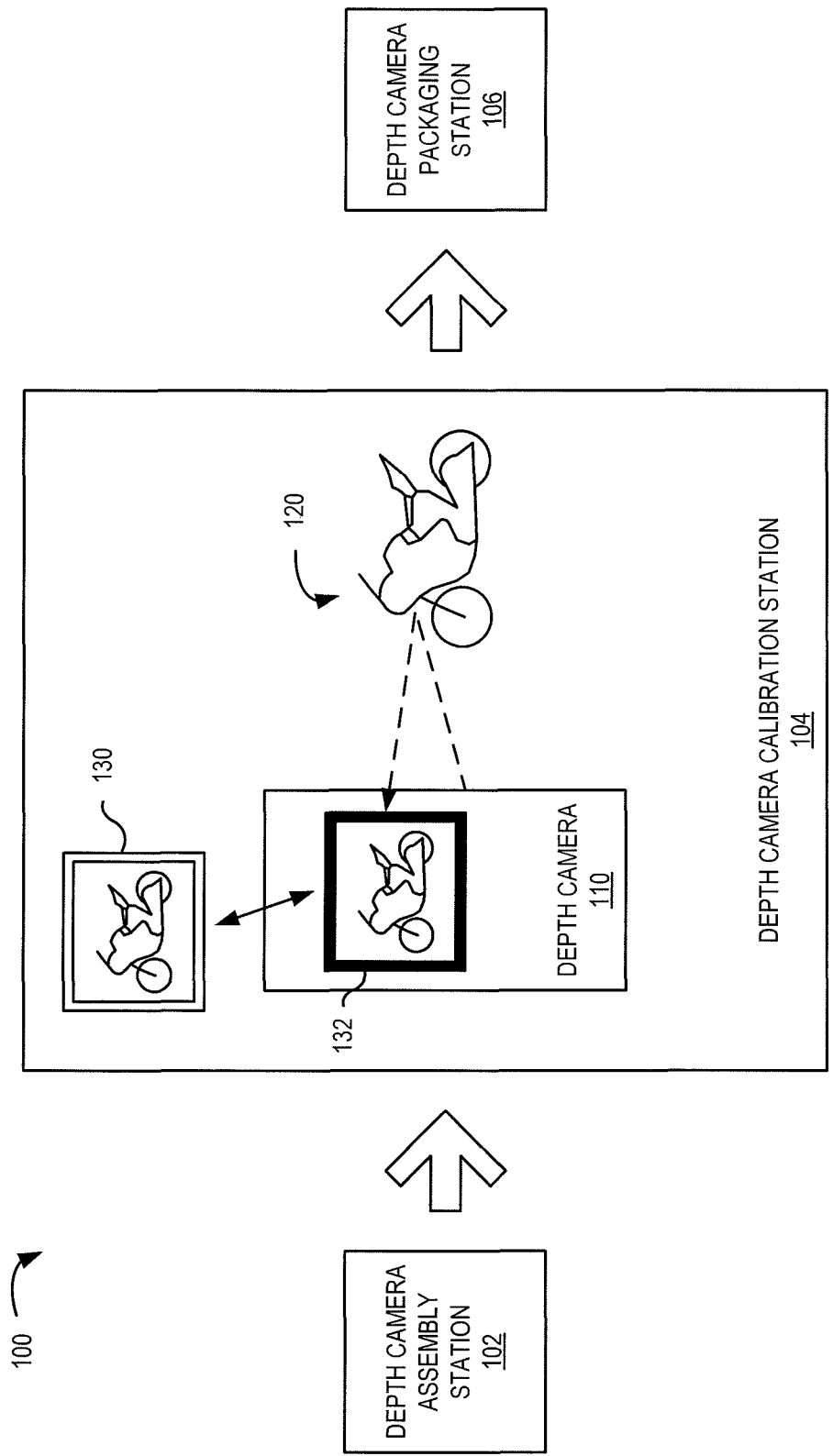
FIG. 1 shows an embodiment of a depth camera assembly system for assembling, calibrating, and packaging a depth camera.

The entertainment value provided by an interactive media experience may be amplified by immersing the user in the media experience. For example, a user's enjoyment of a video game may be intensified when a user controls the gaming experience using natural, physical gestures. As a more specific example, a user may block an incoming attack using a sudden parry gesture with the user's arm instead of a button press to a handheld game controller. Physical gestures can be detected with a depth camera oriented to monitor the user's body position. However, because some gestures may be small by nature, it can be difficult to provide a depth camera that detects such gestures with a precision and accuracy that is compatible with a user-friendly experience without including complicated illumination and imaging systems in the camera. Systems of such complexity may be delicate, making them hard to use in a typical home environment.

Accordingly, various embodiments are described herein that improve the accuracy of depth measurements made by a depth camera. In one example, raw images are processed by the application of a weighting function. In this example, the weighting function is generated in a calibration step in a depth camera manufacturing process. As used herein, calibration may have different meanings according to various embodiments. For example, in some embodiments, calibration may refer to tuning adjustments made to the image processing modules of depth cameras during assembly. Thus, such calibrations may be repeated as each camera is manufactured and tuned prior to shipment.

Additionally or alternatively, in some embodiments, calibration may refer to adjustments made to an image processing module during an image processing module development phase. For example, the calibration method described herein may be performed during testing and manufacturing development of a next-generation image processing module for a next-generation depth camera. It will be appreciated that, in some embodiments, the scale and scope of such calibrations may be comparatively greater than the calibrations performed at the camera level during volume manufacturing and may reflect development objectives for such next-generation depth cameras. In such embodiments, the calibration, once performed, may be incorporated into production depth cameras without additional calibration during a subsequent volume manufacturing phase.

In that step, images of a calibration scene are collected by the depth camera and by a high-precision test source. Differences between the images are used to develop the weighting function. In some examples, a plurality of weighting functions may be developed for application in particular use conditions. Because the calibration step may be performed under controlled conditions, the high-precision test source may achieve levels of accuracy and precision that would be incompatible with a consumer-friendly depth camera. Further, because a single set of reference images may be used to calibrate a virtually unlimited number of depth cameras during high-volume manufacturing, the comparatively higher cost of the high-precision test source (relative to the depth camera) may be distributed over many depth cameras, potentially reducing the unit cost of the depth camera compared to depth cameras including more complicated and expensive illumination and imaging subsystems.

FIG. 1 shows an embodiment of a depth camera assembly system 100 for assembling, calibrating, and packaging a depth camera. As explained above, depth camera assembly system 100 may be used to assemble, calibrate, and package depth cameras during test and development of a depth camera and/or during volume manufacturing of a depth camera. As shown in FIG. 1, depth camera assembly system 100 includes a depth camera assembly station 102 for assembling a depth camera 110. For example, an illumination subsystem and an imaging subsystem may be installed in depth camera 110 at depth camera assembly station 102.

At depth camera calibration station 104, depth camera 110 collects, in a calibration mode, one or more native images 132 from one or more calibration scenes 120. Native image 132 includes test light intensity information that describes the light intensity reflected from various portions and locations in calibration scene 120. The test light intensity information is useable to derive a native depth map for calibration scene 120, the native depth map describing, for a particular pixel of a photosensor included in the imaging system of depth camera 110, a respective physical location in the three-dimensional space of calibration scene 120 from which light incident at the particular pixel was reflected. Thus, the native depth map describes a constellation of physical points corresponding to various reflective surfaces included in calibration scene 120.

As will be described in more detail below, the native depth map for a particular calibration scene is used, in combination with a reference depth map derived from a reference image 130 collected from the particular calibration scene by a high-precision test source, to tune processing of a raw image collected by depth camera 110 in a later-performed operation mode (for example, when a depth camera purchaser collects images with depth camera 110). In this way, a processed image output by depth camera 110 during the operation mode may have, in some circumstances, image characteristics that are comparatively similar to those exhibited by the reference image.

Once depth camera 110 is calibrated at depth camera calibration station 104, depth camera 110 is passed to depth camera packaging station 106, where depth camera 110 is packaged. Packaging may include preparation for shipment to consumers (e.g., in a volume manufacturing scenario) and/or preparation for product testing (e.g., in a next-generation depth camera test/development scenario), concluding the manufacturing process. First use of depth camera 110 by a user (such as a consumer or a product tester) subsequent to manufacturing marks the start of the depth camera operation mode described above. However, it will be appreciated that, in some embodiments, depth camera calibration may be performed at any suitable time, such as in a scenario where depth camera 110 is serviced, inspected, and/or refurbished.

Figure 2A:
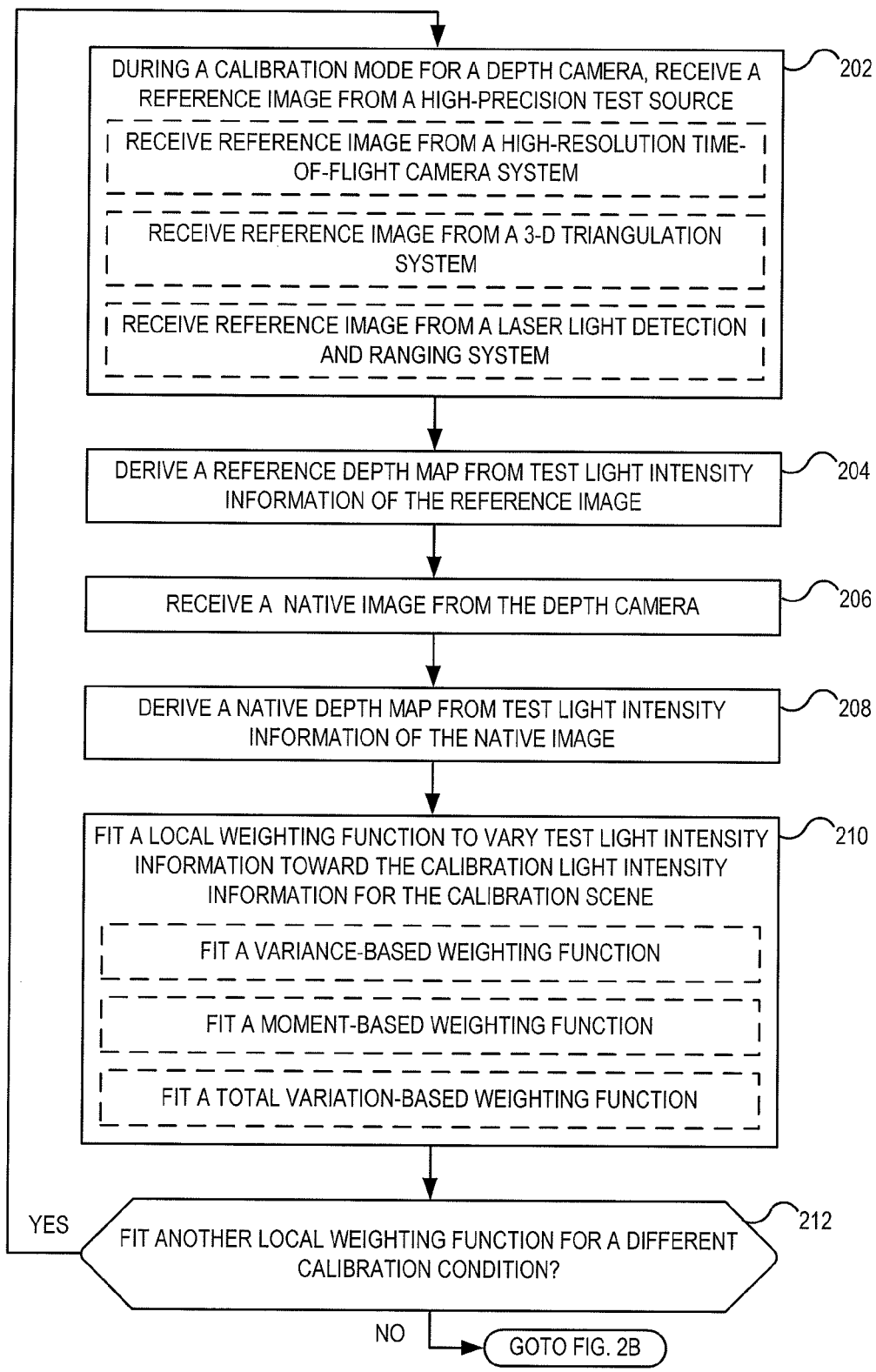
FIG. 2 shows an embodiment of a method for calibrating a depth camera with a high-resolution test source and for outputting a processed image from a depth camera so-calibrated.

FIGS. 2A and 2B show a flow chart illustrating an embodiment of a method 200 for calibrating a depth camera. In the embodiment shown in FIGS. 2A and 2B, portions of method 200 performed during a calibration mode are performed at an image processing module of a computing device compatible with a depth camera, such as a depth camera calibration computing device operatively connected with the depth camera during calibration, while portions of method 200 performed during an operation mode are performed at an image processing module of the depth camera. However, it will be appreciated that, in some embodiments, method 200 may be performed at a depth camera alone, and that, in some other embodiments, portions of method 200 performed during the calibration mode may be performed by the depth camera calibration computing device and the depth camera.

Turning to FIG. 2A, at 202, method 200 includes, during a calibration mode for a depth camera, receiving a reference image from a high-precision test source, and at 204, deriving a reference depth map from calibration light intensity information included in the reference image. As introduced above, a reference image is collected for a particular calibration scene using a test source capable of generating depth information for the calibration scene with a high degree of accuracy and/or precision within an acceptable tolerance. In some embodiments, the high-precision test source may be able to generate depth information for a particular calibration scene that is reliably more accurate than depth information generated by the depth camera.

For simplicity, the embodiments described herein relate to a high-precision test source including a high-resolution time-of-flight depth camera system. In such systems, calibration light is emitted by the depth camera system at one time. The calibration light is reflected from a surface of an object being imaged and captured at a photosensor of the depth camera system at later time. Depth information from the reflected calibration light is derived from the difference between the emission and capture times. However, it will be understood that any suitable test source may be employed without departing from the scope of the present disclosure. Non-limiting examples high-precision test sources include high-resolution time-of-flight depth camera systems, three-dimensional triangulation systems (such as 3-D laser scanners), and laser light detection and ranging (LIDAR) systems.

Figure 3:
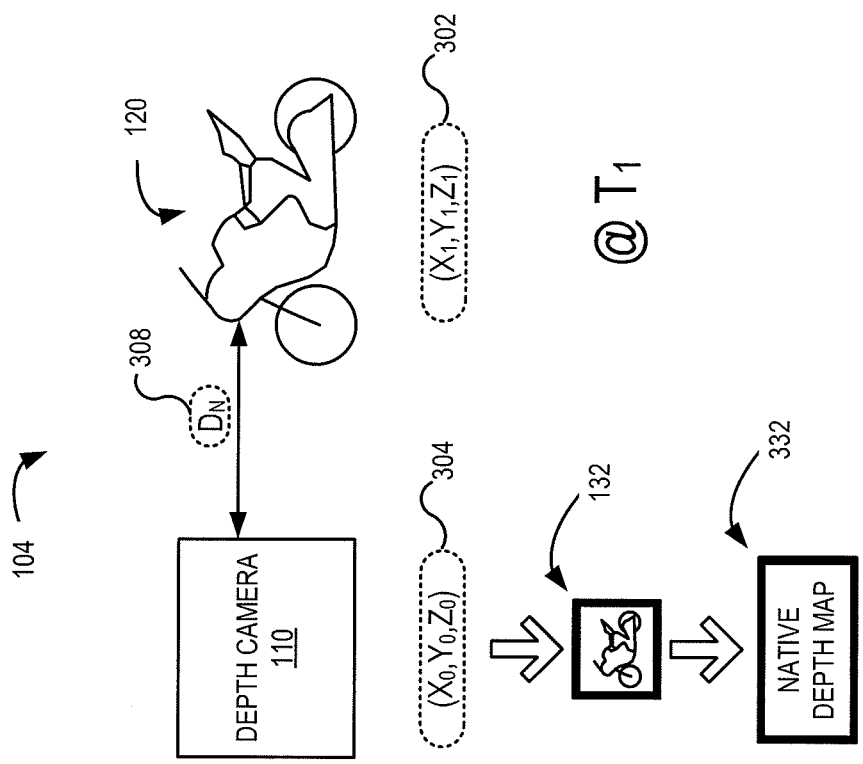
FIG. 3 schematically shows an embodiment of a calibration station for generating a reference image from a calibration scene using a high-resolution test source.

FIG. 3 schematically shows an embodiment of depth camera calibration station 104 at a time $T_0$. As shown in FIG. 3, high-precision test source 300, located at an image collection position 304 (shown as position $(X_0, Y_0, Z_0)$), collects a reference image 130 of a motorcycle located at a scene position 302 (shown as position $(X_1, Y_1, Z_1)$), scene position 302 and image collection position 304 separated by a suitable distance. As explained above, calibration light intensity data included in reference image 130 is used to derive a reference depth map 330. Reference depth map 330 describes, for a particular pixel of a photosensor included in high-precision test source 300, a respective physical location in the three-dimensional space of calibration scene 120 from which calibration light incident at the particular pixel was reflected. For example, the embodiment shown in FIG. 3 depicts reference image distance information 306 (shown as "$D_R$") derived from time-of-flight light reflectivity information for a particular point on the front fairing of the motorcycle.

In some embodiments, high-precision test source 300 may collect a plurality of reference images 130 from a plurality of calibration scenes 120. The plurality of calibration scenes 120 may include scenes generated by varying lighting conditions for a particular object (e.g., where illumination source temperature, intensity, and/or position are varied), by varying object distance and/or size, and by varying object surface reflectivity (e.g., surfaces causing specular or diffuse reflections). The plurality of calibration scenes 120 may be selected in consideration of how the depth camera may be used. For example, if a depth camera is configured to be used with a game console, conditions for a plurality of calibration scenes 120 may be selected to resemble conditions for rooms configured for leisure and social activities in a user's home.

Turning back to FIG. 2A, at 206, method 200 includes receiving a native image from the depth camera being calibrated and, at 208, deriving a native depth map from test light intensity information included in the reference image. For simplicity, the depth camera described herein is a time-of-flight depth camera configured to collect a native image by emitting test light and capturing reflected test light, such as test light reflected from a surface of an object included in a calibration scene. However, it will be appreciated that any suitable depth camera may be employed without departing from the scope of the present disclosure. One non-limiting example includes a three-dimensional scanner configured to emit structured light (such as infrared light).

Figure 4:
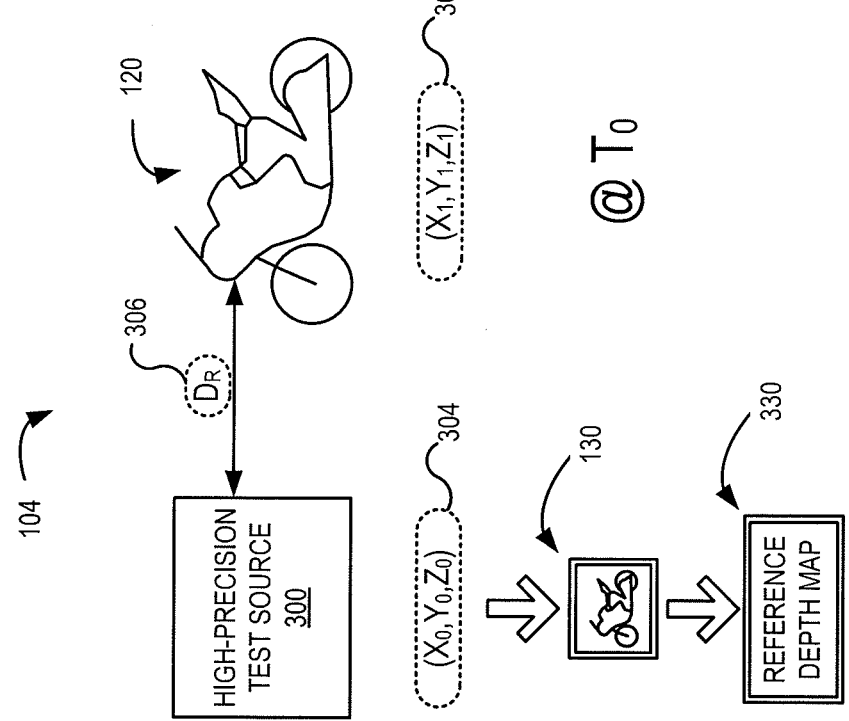
FIG. 4 schematically shows, at a later time, the embodiment of the calibration station depicted in FIG. 3 for generating a native image from the calibration scene using a depth camera.

FIG. 4 schematically shows an embodiment of the depth camera calibration station 104 shown in FIG. 3. In FIG. 4, depth camera calibration station is shown at a later time $T_1$. As shown in FIG. 4, depth camera 110 is located at the same image collection position 304 (shown as position $(X_0, Y_0,$ $Z_0$)) at which high-precision test source 300 was positioned when reference image 130 was collected. Depth camera 110 collects a native image 132 of a motorcycle located at the same scene position 302 (shown as position $(X_1, Y_1, Z_1)$) as shown in FIG. 3. Thus, in the embodiment shown in FIG. 4, depth camera 110 and high-resolution test source 300 are positioned so that the perspective of depth camera 110 matches, within an acceptable tolerance, the perspective of high-precision test source 300. Being so positioned, a native depth map 332 derived from test light intensity data included in native image 132 may be used, in conjunction with reference depth map 330, to calibrate depth camera 110, as described in more detail below.

In embodiments where a plurality of reference images 130 are collected from a plurality of calibration scenes 120, depth camera 110 collects corresponding native images 132 for the plurality of calibration scenes 120, being positioned to match the respective perspective of high-precision test source 300 for each native image 132 collected.

While the example provided above describes one or more native images 132 being collected from the same camera position and perspective from which respective reference images 130 were collected, it will be understood that, in some embodiments, acceptable position variation may exist to compensate for differences in perspective between high-precision test source 300 and depth camera 110 (e.g., physical differences and/or operational differences). Further, in some embodiments, acceptable perspective variation may be encountered from variations encountered during calibration (e.g., variation in calibration station configuration and/or operation). Regardless of the source of the position and/or perspective variation, in such embodiments, suitable position and/or perspective measurements may be performed to compensate for such variations.

As explained above, a native depth map and a reference depth map derived from images collected from a particular calibration scene may be used to calibrate the depth camera. Because the respective depth maps are derived from images of the same (within an acceptable tolerance) calibration scene, the algorithms used to derive a native depth map from a native image may be adjusted, in the calibration mode, to generate depth information that resembles the reference depth map for that scene. Set in the context of FIGS. 3 and 4, described above, a weighting function may be derived from reference depth map 330 and native depth map 332 so that, for a particular pixel or pixel region, native image distance information 308 (shown as "$D_N$") approaches reference image distance information 306 (shown as "$D_R$"). For example, the weighting function may be configured so that a difference $D_R - D_N$ approaches zero.

Turning back to FIG. 2A, at 210, method 200 includes fitting a local weighting function to vary test light intensity information toward the calibration light intensity information for the calibration scene. Because depth information for an image may be derived from light intensity information, in some embodiments, a weighting function may be generated to vary the native test light intensity for a particular pixel of the depth camera toward the calibration light intensity for the same pixel during the calibration mode. Subsequently, in the operation mode, the weighting function may act as a scalar for light intensity levels received from that particular pixel of the depth camera for inclusion in a processed image (in contrast with un-scaled light intensity information present in the corresponding raw image). Once scaled, the resulting depth information for the processed image may be more accurate and/or precise than depth information for the raw image.

For example, let $L_K(I,J)$ represent test light intensity information registered by a pixel in an I-th row and a J-th column ("pixel (I,J)") of a photosensor of a K-th native image provided by the depth camera. Thus, if $L^*_K(I,J)$ represents an intensity of a pixel in an I-th row and a J-th column of the processed image, $L^*_K(I,J)$ may be generated from the weighting function and the raw light intensity information:

$$L^*_K(I,J) = \sum_{M,N \in A} W(I+M, J+N) L(I+M, J+N)_K$$

where $W(I+M, J+N)$ is a weighting function and where A represents a neighborhood of pixels in the reference and native images including pixel (I,J).

In some embodiments, the weighting function may be fit so that a difference between the test light intensity information and the calibration light intensity information is minimized. In some of such embodiments, minimizing the difference may include minimizing a difference between the native depth map for a particular pixel of the native image and the reference depth map for a respective pixel included in the respective reference image. Thus, the weighting function may be fit by minimizing an objective function O. An example of such embodiments is described below, though it will be appreciated that other suitable fitting and optimization schemes may be employed without departing from the scope of the present disclosure.

For example, let O be a function of the processed light intensity information for pixel (I,J), $L^*_K(I,J)$, and of the calibration light intensity information for pixel (I,J), $TL_K(I,J)$ of a K-th reference image provided by the high-precision test source:

$$O = TL_K(I,J) - L^*_K(I,J)$$

$$O = \sum_{I,J,K} \left[ TL_K(I,J) - \sum_{M,N \in A} W(I+M, J+N) L(I+M, J+N)_K \right]^2$$

In some embodiments, the local weighting function may be configured as a function of a set of N features of pixels in a neighborhood A of a particular pixel, so that the weighting function is fit according to variance, moments, and/or total variation in the feature set. In such embodiments, the weighting function may be a function of one or more of a variance, a moment, and a total variation between a pixel included in the native image and a respective pixel included in the respective reference image. However, it will be appreciated that other suitable methods of varying light intensity data for a particular pixel and/or for neighboring pixels proximal to that particular pixel may be employed without departing from the scope of the present disclosure.

While the weighting functions described above relate to processing performed on a raw image in an image processor of the depth camera (e.g., after the raw image is collected), it will be appreciated that, in some embodiments, a weighting function may be configured to vary hardware characteristics of the depth camera. For example, the weighting function may alter a gain for a photomultiplier operatively coupled with that particular pixel, so that the light intensity information generated by a pixel is scaled during generation of the image.

At 212, method 200 determines whether another local weighting function is to be fit for a different calibration condition. As explained above, in some embodiments, a plurality of reference and native images may be collected from a plurality of calibration scenes in consideration of various anticipated use conditions for the depth camera during the operation mode. In such embodiments, a plurality of local weighting functions may be generated according to such use conditions, so that a particular local weighting function tailored to a particular use condition may be selected. For example, in one scenario, a low-light local weighting function (or functions) may be generated from a calibration scene having a low-light condition. During an operation mode, the low-light local weighting function may be selected, programmatically or in response to user input, when low-light conditions exist. Thus, in some embodiments, a particular calibration scene may be one of a plurality of calibration scenes and a particular weighting function may be one of a plurality of local weighting functions. In such embodiments, each local weighting function may be fit to vary test light intensity information toward the calibration light intensity for a particular calibration scene of the plurality of calibration scenes.

In the embodiment shown in FIG. 2, if additional local weighting functions are to be fit, method 200 returns to 202, though it will be appreciated that in some embodiments, method 200 may return to any other suitable step, such as receiving a native image 206 or fitting a local weighting condition 210. If no additional local weighting functions are to be fit, method 200 continues to 214, shown in FIG. 2B.

Turning to FIG. 2B, method 200 includes, at 214, generating a global weighting function from a plurality of local weighting functions. In some embodiments, a global weighting function may be generated from a plurality of local weighting functions. With reference to the low-light condition scenario described above, in some of such embodiments, the global weighting function may be applied regardless of a condition of a use environment during the operation mode. In others of such embodiments, the global weighting function may be configured to emphasize the application of a low-light local weighting function in low-light conditions, while de-emphasizing the application of other local weighting functions, during the operation mode.

For clarity of explanation, FIG. 2B includes a metaphorical boundary 216, indicating a transition from a calibration phase to an operation mode for the depth camera. As explained above, in the operation mode, a raw image collected by the depth camera is converted to a processed image. In one example, during conversion, the weighting function (global or local) scales light intensity levels for a particular pixel of the raw image to generate the processed image. As explained when introducing method 200, in the embodiment of FIGS. 2A and 2B, portions of method 200 performed during an operation mode are performed at an image processing module of the depth camera.

At 218, method 200 includes receiving a raw image from the depth camera, and, at 220, converting the raw image into a processed image according to a weighting function. At 222, method 200 includes outputting the processed image. In some embodiments, outputting the processed image may include providing the processed image to a game console, though it will be appreciated that any suitable output may be performed without departing from the scope of the present embodiment.

Figure 5:
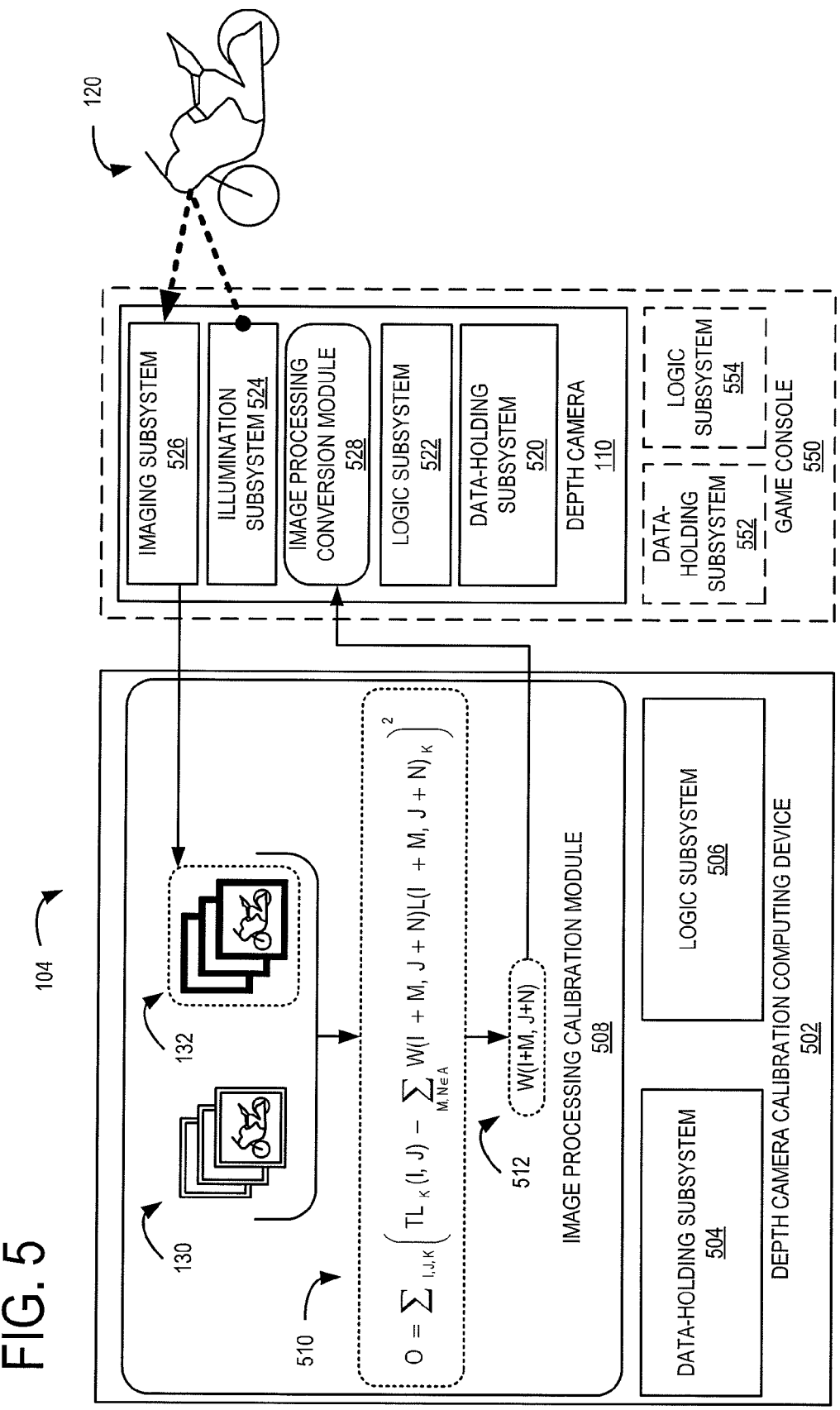
FIG. 5 schematically shows another embodiment of a calibration station for calibrating a depth camera.

FIG. 5 schematically shows an embodiment of a depth camera calibration station 104, including a depth camera calibration computing device 502, a data-holding subsystem 504, and a logic subsystem 506. Depth camera calibration computing device 502 also includes an image processing calibration module 508. In the embodiment shown in FIG. 5, image processing calibration module 508 is configured to receive, in a calibration mode, a plurality of reference images 130 from a high-precision test source for a plurality of calibration scenes 120, and a plurality of native images 132 output from depth camera 110 for the same set of calibration scenes 120. For each calibration scene, image processing calibration module 508 fits a local weighting function 512. In the embodiment shown in FIG. 5, local weighting function 512 is fit using an objective function 510. Depth camera calibration computing device 502 then outputs the plurality of local weighting functions 512 to depth camera 110.

As shown in the embodiment depicted in FIG. 5, depth camera 110 includes a logic subsystem 522 and a data-holding subsystem 520. Also included is an illumination subsystem 524 for illuminating an object to be imaged with illumination light. Illumination subsystem 524 may include a suitable light source (not shown) such as a laser configured to emit infrared light and suitable optics (not shown) such as diffraction gratings for tuning projected illumination light. Also included is an imaging subsystem 526 for receiving reflected illumination light. Imaging subsystem 526 may include various light filters (not shown) such as optical filters and band pass filters for filtering reflected illumination light prior to detection at a photosensor (not shown). Depth camera 110 also includes an image processing conversion module 528 configured to convert a raw image into a processed image using weighting functions 512 during an operation mode. Depth camera calibration computing device 502 and depth camera 110 may also include suitable peripheral input/output connections (not shown) configured to exchange reference images, native images, weighting functions, and processed images as described herein. Non-limiting examples of suitable connections include USB, USB 2.0, IEEE 1394, HDMI, 802.11x, and/or virtually any other suitable wired or wireless connection. In some embodiments, depth camera 110 may be included in a game console 550, which may include its own data-holding subsystem 552 and/or logic subsystem 554.

Figure 6:
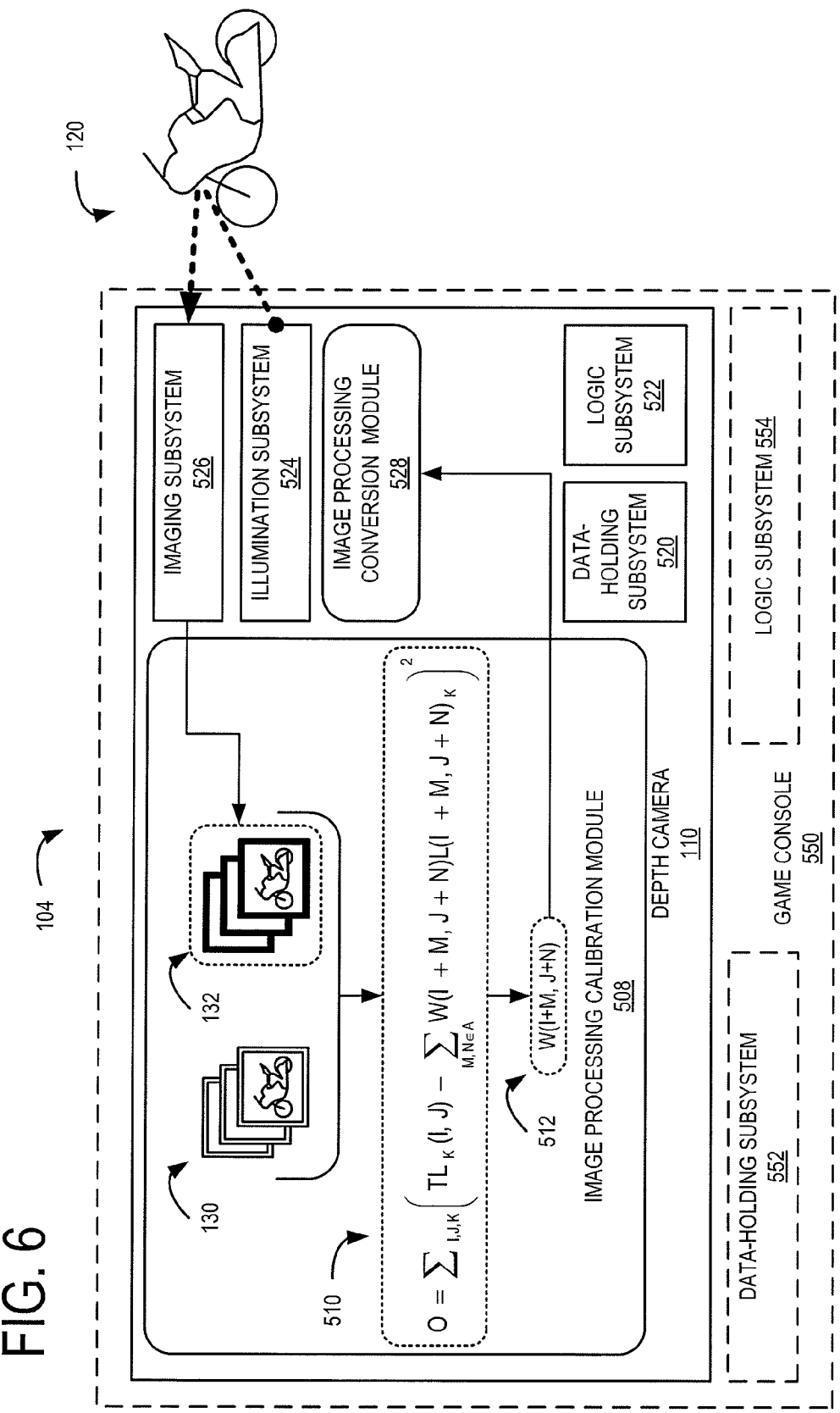
FIG. 6 schematically shows another embodiment of a calibration station for calibrating a depth camera.

It will be appreciated that, in some embodiments, a portion or all of the elements described in depth camera calibration computing device 502 may be included in the depth camera. For example, FIG. 6 schematically shows another embodiment of a depth camera calibration station 104, image processing calibration module 508 and image processing conversion module 528 being included in depth camera 110. Depth camera 110 may also include suitable peripheral input/output connections (not shown) configured to receive reference images and output processed images as described herein.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

It will be understood that he embodiments of computing devices shown in FIGS. 5 and 6 are shown in simplified form, and that virtually any computer architecture may be used without departing from the scope of this disclosure. Logic subsystems, such as logic subsystems 506, 522, and 554, may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystems, such as data-holding subsystems 504, 520, and 552, may include one or more physical, non-transitory, devices configured to hold data and/or instructions executable by the logic subsystem to implement the herein described methods and processes. When such methods and processes are implemented, the state of the data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and the data-holding subsystem may be integrated into one or more common devices, such as an application specific integrated circuit or a system on a chip.

In some embodiments, the data-holding subsystem may include removable computer-readable storage media (not shown), which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "module" may be used to describe an aspect of the computing devices described herein that is implemented to perform one or more particular functions. In some cases, a module may be instantiated via a logic subsystem executing instructions held by a data-holding subsystem. It is to be understood that different modules may be instantiated from the same application, service, code block, object, library, routine, API, function, etc. Likewise, the same module may be instantiated by different applications, services, code blocks, objects, routines, APIs, functions, etc. The term "module" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At an image processing module of a computing device compatible with a depth camera, a method of calibrating the depth camera, the method comprising:
   receiving from the depth camera a native image including test light intensity information useable to derive a native depth map for a calibration scene;
   receiving from a high-precision test source a respective reference image taken from a same perspective as the native image and including calibration light intensity information useable to derive a reference depth map for the calibration scene independently from the native depth map; and
   fitting a weighting function to vary test light intensity information toward the calibration light intensity information for the calibration scene, the weighting function configured to scale light intensity information for a plurality of raw images received by the depth camera during a subsequent operation mode wherein the depth camera is operated independently from the high-precision test source.

2. The method of claim 1, wherein the calibration scene is one of a plurality of calibration scenes, and wherein the weighting function is one of a plurality of local weighting functions, each local weighting function being fit to vary test light intensity information toward the calibration light intensity information for a particular calibration scene of the plurality of calibration scenes.

3. The method of claim 2, further comprising generating a global weighting function for the depth camera from the plurality of local weighting functions.

4. The method of claim 1, wherein receiving the respective reference image from the high-precision test source includes receiving the respective reference image from a high-resolution time-of-flight camera system.

5. The method of claim 1, wherein receiving the respective reference image includes receiving the respective reference image from a 3-D triangulation system.

6. The method of claim 1, wherein receiving the respective reference image includes receiving the respective reference image from a laser light detection and ranging system.

7. The method of claim 1, wherein the weighting function is a function of one or more of a variance, a moment, and a total variation between a pixel included in the native image and a respective pixel included in the respective reference image.

8. The method of claim 1, wherein fitting the weighting function includes minimizing a difference between the test light intensity information and the calibration light intensity information.

9. The method of claim 8, wherein minimizing the difference includes minimizing a difference between the native depth map for a particular pixel of the native image and the reference depth map for a respective pixel included in the respective reference image.

10. A computing device configured to calibrate a depth camera, the computing device comprising:
a depth camera input configured to receive an image collected by the depth camera;
a logic subsystem; and
a data-holding subsystem holding instructions executable by the logic subsystem to:
receive from the depth camera a native image including test light intensity information useable to derive a native depth map for each of a plurality of calibration scenes,
receive from a high-precision test source that is different from the depth camera, a respective reference image taken from the same perspective as the native image including calibration light intensity information useable to derive a reference depth map for each of the plurality of calibration scenes,
for each of the plurality of calibration scenes, fit a local weighting function to vary test light intensity information toward the calibration light intensity information, and
generate a global weighting function for the depth camera from the local weighting functions.

11. The computing device of claim 10, wherein the global weighting function is a function of one or more of a variance, a moment, and a total variation between a pixel included in the native image and a respective pixel included in the respective reference image.

12. The computing device of claim 10, wherein fitting the local weighting function includes minimizing a difference between the test light intensity information and the calibration light intensity information.

13. The computing device of claim 12, wherein minimizing the difference includes minimizing a difference between the native depth map for a particular pixel of the native image and the reference depth map for a respective pixel included in the respective reference image.

14. The computing device of claim 10, wherein the high-precision test source includes one of a high-resolution time-of-flight camera system, a 3-D triangulation system, and a laser light detection and ranging system, and wherein the high-precision test source is configured to generate depth information for a particular calibration scene that is reliably more accurate than depth information generated by the depth camera.

15. A depth camera computing device including an image processing module configured to output a processed image by application of a global weighting function to a raw image, the depth camera computing device comprising:
a depth camera; and
a data-holding subsystem holding instructions executable by a logic subsystem to:
receive a raw image of a use environment from the depth camera,
convert the raw image into a processed image according to a weighting function and without receiving a corresponding reference image of the use environment, the weighting function generated by varying test light intensity information generated by the depth camera from a native image previously collected by the depth camera from a calibration scene toward calibration light intensity information of a reference image collected by a high-precision test source, different than the depth camera, from a same perspective as the native image, and
output the processed image.

16. The depth camera of claim 15, wherein the test light intensity information is useable to derive a native depth map for the native image, and wherein the calibration light intensity information is useable to derive a reference depth map for the reference image.

17. The depth camera of claim 16, wherein the weighting function is configured to adjust depth information for a particular pixel of the native image toward depth information for a respective pixel of the reference image included in the reference depth map.

18. The depth camera of claim 16, wherein the calibration scene is one of a plurality of calibration scenes for which a native image and a respective reference image are collected, wherein the weighting function is a global weighting function generated from a plurality of local weighting functions, each local weighting function being fit to vary test light intensity information of a particular native image toward the calibration light intensity information of a particular reference image for a particular calibration scene of the plurality of calibration scenes.

19. The depth camera of claim 18, wherein the instructions are further configured to select a particular local weighting function to be used instead of the global weighting function to process the native image according to an image quality of the native image prior to the native image being so processed.

20. The depth camera of claim 15, wherein the weighting function is a function of one or more of a variance, a moment, and a total variation between a pixel included in the native image and a respective pixel included in the respective reference image.

* * * * *